US008009906B2

(12) United States Patent
Tin

(10) Patent No.: US 8,009,906 B2
(45) Date of Patent: Aug. 30, 2011

(54) SPECTRAL GAMUT MAPPING BASED ON A COLORIMETRIC GAMUT MAPPING

(75) Inventor: Siu-Kei Tin, Milpitas, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 930 days.

(21) Appl. No.: 11/954,184

(22) Filed: Dec. 11, 2007

(65) Prior Publication Data

US 2009/0148040 A1   Jun. 11, 2009

(51) Int. Cl.
*G06K 9/00* (2006.01)

(52) U.S. Cl. ........ 382/167; 382/162; 382/274; 382/305; 358/1.9; 358/518; 358/535

(58) Field of Classification Search ............... 382/162, 382/167, 274, 305; 358/1.9, 518, 535, 509, 358/519, 523; 345/589, 590, 600, 610
See application file for complete search history.

(56) References Cited

U.S. PATENT DOCUMENTS

| | | | |
|---|---|---|---|
| 6,587,793 B2 | 7/2003 | Viassolo et al. | |
| 6,698,860 B2 | 3/2004 | Berns et al. | 347/15 |
| 6,850,342 B2 | 2/2005 | Woolfe et al. | 358/1.9 |
| 6,920,244 B2 | 7/2005 | Rosen et al. | 382/162 |
| 7,072,511 B2 | 7/2006 | Tan et al. | 382/167 |
| 7,081,925 B2 | 7/2006 | Yang et al. | 348/655 |
| 7,184,057 B2 | 2/2007 | Stokes et al. | 345/600 |
| 2002/0165684 A1 | 11/2002 | Olson | 702/85 |
| 2002/0196972 A1 | 12/2002 | Bayramoglu et al. | 382/167 |
| 2005/0069200 A1 | 3/2005 | Speigle et al. | 382/162 |
| 2005/0254073 A1* | 11/2005 | Braun et al. | 358/1.9 |
| 2007/0121132 A1* | 5/2007 | Blinn et al. | 358/1.9 |
| 2008/0239417 A1* | 10/2008 | Tsutsumi | 358/518 |

OTHER PUBLICATIONS

Romney, A. Kimball and Indow, Tarow, "Munsell Reflectance Spectra Represented in Three-Dimensional Euclidean Space", School of Social Sciences, University of California-Irvine, Irvine, CA 92697-5100, Wiley Periodicals, Inc. pp. 182-196(2003).
Greenberg, Donald P., "A Framework for Realistic Image Synthesis", Communications of the ACM, vol. 42, No. 8, pp. 46 to 52, Aug. 1999.
Tsutsumi, S., Rosen, M., and Berns, R., "Spectral Reproduction using LabPQR: Inverting the Fractional-Area-Coverage-to-Spectra Relationship", Proc. ICIS '06, pp. 107-110 (2006).

(Continued)

*Primary Examiner* — Samir A Ahmed
*Assistant Examiner* — Ali Bayat
(74) *Attorney, Agent, or Firm* — Fitzpatrick, Cella, Harper & Scinto

(57) ABSTRACT

Mapping spectral colors in an Interim Connection Space (ICS) of a full spectral space based on a colorimetric gamut map in a color space is provided. A spectral color value in the ICS is accessed, and the spectral color value is transformed into a calorimetric color value in the color space. The calorimetric color value is mapped into mapped calorimetric color value in a first subspace of the ICS. Mapping the colorimetric color value includes gamut-mapping the calorimetric color value using the calorimetric gamut map, followed by identifying the color space with the first subspace. An intersection of a spectral gamut in the ICS and an affine subspace characterized by the mapped colorimetric color value is determined, and the spectral color value is projected onto the intersection. The first subspace is an orthogonal complement of a null space of a transformation from the ICS to the color space.

20 Claims, 14 Drawing Sheets

OTHER PUBLICATIONS

Rosen, M., and Derhak, M., "Spectral Gamuts and Spectral Gamut Mapping" Proc. of SPIE-IS&T, vol. 6062, pp. 1-11 (2006).

Tsutsumi, S., Rosen M., and Berns, R., "Spectral Color Management using Interim Connection Spaces based on Spectral Decomposition", Proc. 14th CIC, pp. 246-151 (2006).

Derhak, Maxim W. and Rosen, Mitchell R., "Spectral Colorimetry Using LabPQR-An Interim Connection Space", Proc. 12th CIC, pp. 246-250 (2004).

Rosen, et al., "Answering Hunt's Web Shopping Challenge: Spectral Color Management for a Virtual Swatch", Proc. of the IS&T/SID 9th Color Imaging Conference, pp. 267-272.

Rosen, et al. "Spectral Color Processing Using an Interim Connection Space", Proc. 11th CIC, pp. 187-192 (2003).

Wyszecki, et al., "Color Science: Concepts and Method, Quantitative Data and Formulae", 2nd Ed., Wiley, (1982).

ISO/TR 16066:2003(E), "Graphic Technology—Standard Object Color Spectra Database for Color Reproduction Evaluation" (SOCS), ISO (2003).

Johnson, et al., "Full-Spectral Color Calculations in Realistic Image Synthesis", IEEE Computer Graphics and Applications (1999).

Li, et al., "Color Constancy Based on Reflectance Functions", Proc. 14th CIC, pp. 175-179 (2006).

U.S. Appl. No. 11/609,280, filed Dec. 11, 2006, entitled "Constructing Basis Functions Using Sensor Wavelength Dependence" by Siu-Kei Tin.

U.S. Appl. No. 11/947,741, filed Nov. 29, 2007, entitled "Generating an Interim Connection Space for Spectral Data" by Siu-Kei Tin.

U.S. Appl. No. 11/947,487, filed Nov. 30, 2007, entitled "Generating a Transformed Interim Connection Space for Spectral Data" by Siu-Kei Tin.

U.S. Appl. No. 11/948,977, filed Nov. 30, 2007, entitled "Generating a Device Independent Interim Connection Space for Spectral Data" by Siu-Kei Tin.

U.S. Appl. No. 12/011,318, filed Jan. 23, 2008, entitled "Gamut Mapping in Spectral Space Based on an Objective Function" by Siu-Kei Tin.

* cited by examiner

SPECTRAL GAMUT MAPPING BASED ON A COLORIMETRIC GAMUT MAPPING

BACKGROUND

1. Field of the Invention

This invention pertains to the use of spectral gamut mapping, and in particular, pertains to spectral gamut mapping based on a colorimetric gamut mapping.

2. Related Background Art

There is an increasing trend for color imaging applications to process and utilize spectral data, and/or to perform color processing in a spectral color space. For example, it has become common to characterize color devices such as scanners, cameras, printers and displays, in terms of their spectral responsively, such as by obtaining a so-called spectral device profile. Once a spectral characterization of a device is obtained, operations such as transforming color data from a source device to a destination device, gamut mapping, etc., can be performed in the full spectral space.

As another example, some modem image capture devices can capture color image data in spectral or extended color spaces. In this regard, the use of spectral data such as spectral reflectance of objects and spectral power distribution of illuminants promises to yield even more advantages in the near future. Ultimately, one goal of spectral color reproduction is to produce color reproductions with remarkably high color fidelity, perhaps even matching the original scene on the spectral level. In the case of reflective objects, for example, a reproduction with a spectral match would have the same color as the original object under any illuminant.

Spectral characterization of color devices, and development of multi-spectral devices such as multi-spectral cameras and multi-spectral printers, could form the basis of a spectral color management workflow that can have very useful applications in everyday consumer products. For example, such technologies could allow online shoppers to print their own "virtual swatches" of fabrics, as detailed in the paper "Answering Hunt's Web Shopping Challenge: Spectral Color Management for a Virtual Swatch" by Rosen et al., Proceedings of the IS&T/SID 9$^{th}$ Color Imaging Conference, pp. 267-272. Another application of spectral color management in computer aided design/computer aided manufacturing (CAD/CAM) applications allows manufacturers to visualize and demonstrate preliminary design ideas by simulation, before actually building a costly prototype.

While the use of spectral data can provide many advantages, such as reducing metamerism, using spectral data presents some challenges in the context of gamut mapping. As in the calorimetric case where different devices have different colorimetric gamuts, in the spectral case, different devices have different spectral gamuts. Spectral color reproduction requires accommodating the difference in spectral gamuts. A standard approach to this problem in the calorimetric case is gamut mapping. Extending conventional, calorimetric gamut mapping algorithms to spectral gamut mapping algorithms however requires overcoming some difficulties. In particular, unlike conventional color spaces such as CIELAB and CIECAM02, there is no appearance attributes such as lightness or chroma to establish mapping direction. A basic question for spectral gamut mapping is how to design algorithms that do not require these appearance attributes.

Another difficulty comes from the high dimensionality of the spectral data. A known approach to this problem is the construction of Interim Connection Spaces (ICSs), which are of lower dimension than the full spectral space. Gamut mapping in ICSs instead of the full spectral space can alleviate some of the computational burden associated with high dimension, but the problem is still formidable without novel algorithms. This is because, although the dimension of the ICS is lower, it is nevertheless higher than three dimensions. Consequently, use of ICS in computationally intensive operations such as certain geometrical operations used in gamut mapping can be a major bottleneck in a spectral color management computational pipeline.

SUMMARY

To address the foregoing, the present invention provides for spectral gamut mapping based on a colorimetric gamut mapping.

In one example embodiment of the present invention, a spectral color value in the Interim Connection Space is accessed, the spectral color value is transformed into a colorimetric color value in the color space, and the colorimetric color value is mapped into mapped colorimetric color value in a first subspace of the Interim Connection Space. Mapping the calorimetric color value includes gamut-mapping the calorimetric color value using the colorimetric gamut map, followed by identifying the color space with the first subspace. An intersection of a spectral gamut in the Interim Connection Space and an affine subspace characterized by the mapped calorimetric color value is determined, and the spectral color value is projected onto the intersection. The first subspace is an orthogonal complement of a null space of a transformation from the Interim Connection Space to the color space.

The mapping of spectral colors based on a colorimetric gamut map can provide several advantages. The spectral gamut mapping produced is continuous throughout the spectral gamut, while it reduces to the colorimetric gamut map on the colorimetric level. In addition, most, if not all, calorimetric gamut mapping algorithms can be extended to spectral gamut mapping in this manner, and therefore, an immediate arsenal of spectral gamut mapping algorithms can be made available from the vast research of colorimetric gamut mapping. Further, the spectral mapping takes place in a simple geometric gamut in the Interim Connection Space, instead of some complicated structure representing the spectral gamut, such as a set of nested three-dimensional gamuts, thus providing a more intuitive approach to visualize the spectral gamut mapping.

In one example aspect of the invention, a minimum distance projection of the calorimetric color value onto the colorimetric gamut is determined. In this case, the minimum distance projection is based on a distance in the color space.

In one example aspect of the invention, accessing the spectral color value includes determining whether the spectral color value is within the spectral gamut, and ending the method without performing the transforming, the mapping, the determining, or the projecting, if the spectral color value is within the spectral gamut.

In another example aspect of the invention, constructing the calorimetric gamut includes obtaining spectral measurements of color samples, transforming the spectral measurements into the color space, and constructing a convex hull based on the transformed spectral measurements.

In yet another example aspect, transforming the spectral measurements into the color space includes transforming the spectral measurements into the Interim Connection Space, and transforming the transformed spectral measurements in the Interim Connection Space into the color space.

In another example aspect, constructing the spectral gamut includes obtaining spectral measurements of color samples, transforming the spectral measurements into the Interim Connection Space, and constructing a convex hull based on the transformed spectral measurements.

In a further example aspect of the invention, projecting the spectral color value onto the intersection includes projecting the spectral color value onto a closest point on the intersection. In another aspect, projecting the spectral color value onto the intersection includes performing an orthogonal projection of the spectral color value onto the affine subspace, and projecting a result of the orthogonal projection onto the intersection.

The invention may be embodied in a method, apparatus or computer-readable memory medium which stores computer-executable program code.

This brief summary has been provided so that the nature of the invention may be understood quickly. A more complete understanding of the invention can be obtained by reference to the following detailed description in connection with the attached drawings.

DETAILED DESCRIPTION

Figure 1:
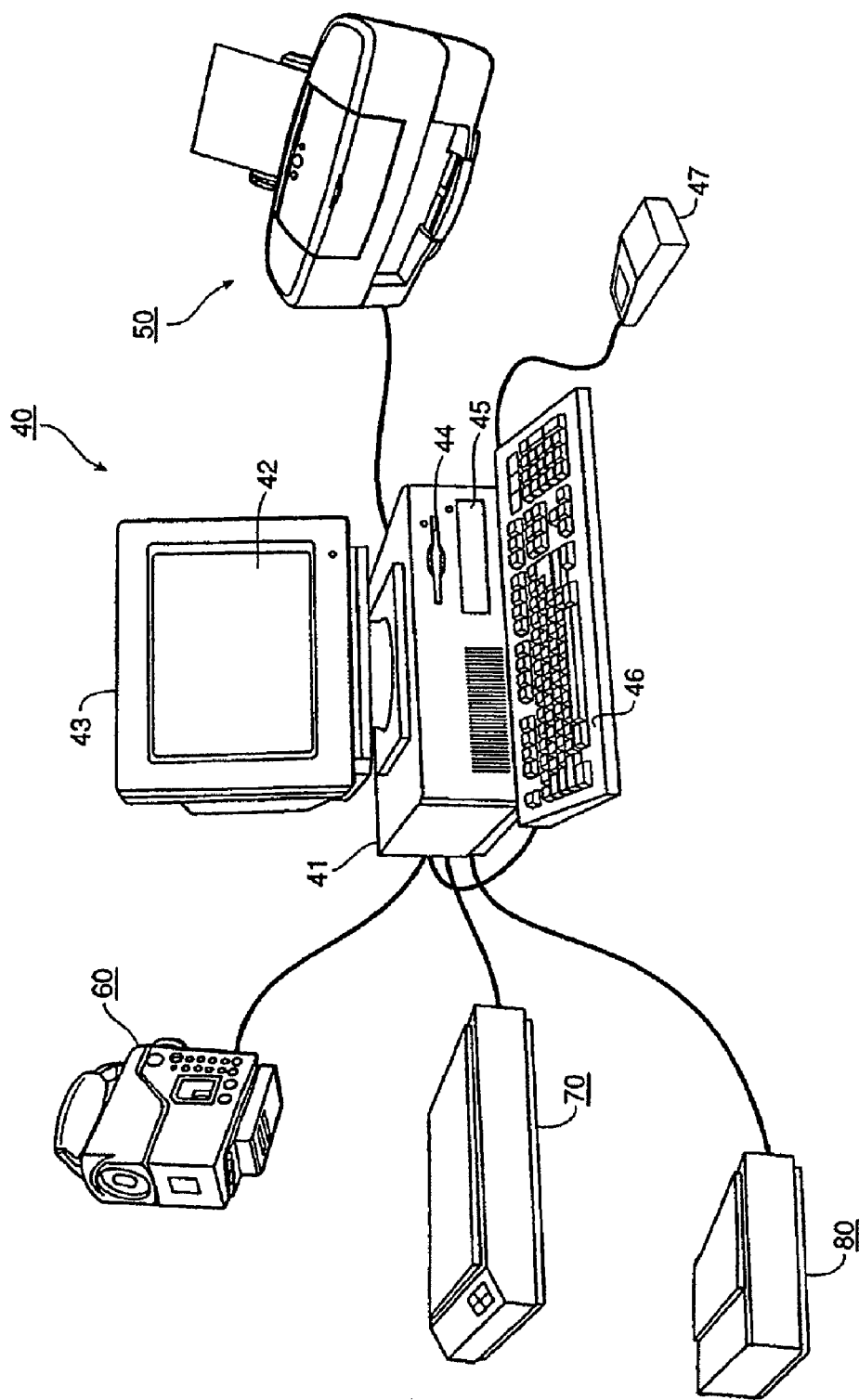
FIG. 1 is a perspective view of an exemplary computing environment in which the present invention may be implemented.

FIG. 1 is a perspective view of a representative computing system including a data processing system 40, peripherals and digital devices that may be used in connection with the practice of the present invention. Data processing system 40 includes host processor 41, which comprises a personal computer (hereinafter "PC"). Provided with data processing system 40 are color monitor 43 including display screen 42, keyboard 46 for entering text data and user commands, and pointing device 47. Pointing device 47 can comprise a mouse and/or a pen-style input device (not shown) for pointing and for manipulating objects displayed on display screen 42.

Data processing system 40 includes a computer-readable memory medium such as computer fixed disk 45 and/or floppy disk drive 44. Floppy disk drive 44 provides a means whereby data processing system 40 can access information, such as image data, computer-executable process steps, application programs, etc. stored on removable memory media. A similar CD-ROM interface (not shown) may be provided for data processing system 40 through which data processing system 40 can access information stored on removable CD-ROM media.

Printer 50 is a printer, such as a color bubble jet printer, which forms color images on a recording medium such as paper or transparencies or the like. In addition, digital color scanner 70 is provided for scanning documents and images into data processing system 40 and digital color camera 60 is provided for sending digital images to data processing system 40. Of course, data processing system 40 may acquire digital image data from other sources such as a digital video camera, a server on a local area network, the Internet, etc. (not shown). A spectrophotometer 80 may be provided for measuring the spectral reflectance of a color sample, and sending the spectral data to data processing system 40.

Figure 2:
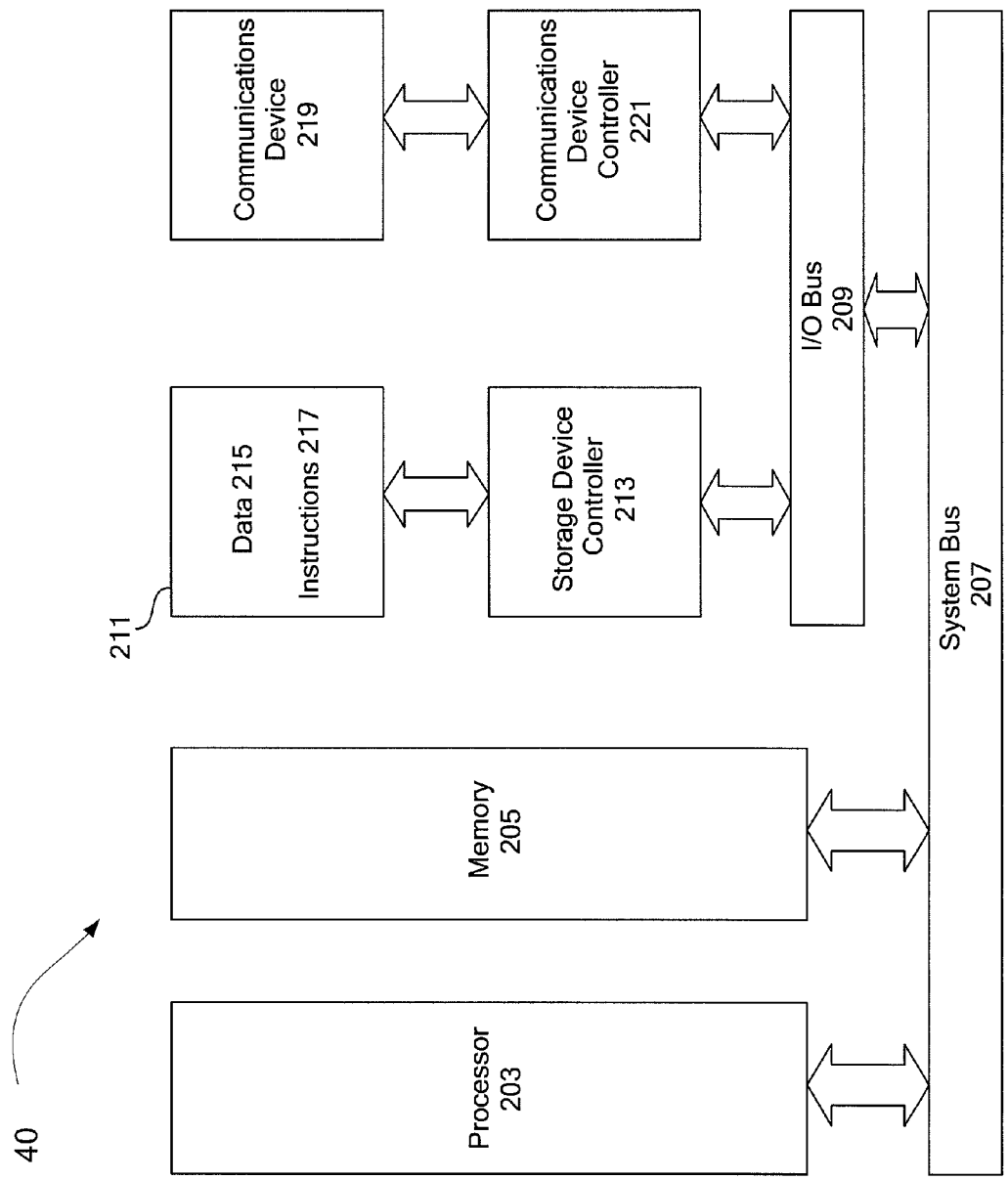
FIG. 2 is a block diagram of an exemplary computer architecture in which the present invention may be implemented.

FIG. 2 is an architecture diagram of an exemplary data processing system 40. Data processing system 40 includes a processor 203 coupled to a memory 205 via system bus 207. The processor is also coupled to external Input/Output (I/O) devices (not shown) via the system bus 207 and an I/O bus 209. A storage device 211 having a computer-readable medium is coupled to the processor 203 via a storage device controller 213 and the I/O bus 209 and the system bus 207. The storage device 211 is used by the processor 203 and controller 213 to store and read/write data 215 and program instructions 217 used to implement the procedures described below.

The processor 203 may be further coupled to a communications device 219 via a communications device controller 221 coupled to the I/O bus 209. The processor 203 uses the communications device 219 to communicate with a network (not shown).

In operation, the processor 203 loads the program instructions 217 from the storage device 211 into the memory 205. The processor 203 then executes the loaded program instructions 217 to perform any of the methods described below. Thus, processor 203 operates under the control of the instructions 217 to perform the methods of the present invention, as described in more detail below.

An example embodiment of the present invention will now be described. It is noted that this example embodiment utilizes the notion of a "constrained" Interim Connection Space (ICS). A constrained ICS has further properties in addition to the requirements of an ICS. These further properties are described in the paragraph below. A construction of a constrained ICS from an ICS that does not have these additional properties is described in more detail below in the section entitled "Constrained ICS". It is noted that if an ICS already possesses these additional properties, no further construction is necessary. In particular, the example embodiment of the present invention does not require or involve the construction of a constrained ICS from an original ICS. It is further noted that the use of particular descriptors, such as "CW" for a constrained ICS, is in no way intended to imply that a particular space, operator, transform, value, etc., is required, and accordingly, use of particular descriptors does not limit the present invention in any way.

In general, an ICS CW is specified by its relationship to the full N-dimensional spectral space, S (where N is typically a number 31 or higher). More precisely, this means there are two linear transformations P:S→CW and Q:CW→S. Now suppose we have a full-rank linear transformation Γ:S→X from the full spectral space S to a color space X. A constrained ICS (relative to the map Γ) has the additional property that the space can be decomposed into an orthogonal sum of two subspaces C and B, written CW=C⊕B. The subspace B is the null space of the composite transformation ΓQ. The subspace C can be identified with the color space X via a linear transformation. In other words, C is linearly isomorphic to X.

Prior to a detailed description of the present example embodiment, the use of constrained ICSs in the present embodiment will now be described in terms of a full spectral space S, a color space X, a map G:X→X, and a linear transformation Γ from S to X.

For example, X could be the CIEXYZ space, and Γ could be the Standard Observer under an illuminant, e.g., CIE Standard Illuminant $D_{50}$. In this case, the map G could be, for example, a gamut mapping on the calorimetric level. The gamut mapping is in general a nonlinear transformation. In addition, it is noted that construction of G is not necessarily tied to X, e.g., it may have been constructed in some other space related to X, but not X itself. For example, G could have been constructed in CIELAB space or a CAM space, which is related to CIEXYZ space by nonlinear transformations.

From the required properties of a constrained ICS CW, X can be identified with a subspace C, and under this identification, the composite map:

$$CW \xrightarrow{Q} S \xrightarrow{\Gamma} X \xleftrightarrow{Isomorphism} C$$

is exactly the orthogonal projection of CW onto the subspace C. It is noted, that while X and C are linearly isomorphic to each other, they in general have different distance metric on them. The metric on C is inherited directly from that on CW, which in turn can be related to a metric on the full spectral space S. On the other hand, the metric on X may be completely unrelated. For example if X is the CIEXYZ space, the metric on X could be the Euclidean distance, which is generally not preferred for judging color difference.

One method according to the present example embodiment includes defining a spectral gamut mapping $\overline{G}$ that extends G, in the sense that the following diagram is "commutative":

$$\begin{array}{ccc} CW & \xrightarrow{\overline{G}} & CW \\ \Gamma Q \downarrow & & \downarrow \Gamma Q \\ X & \xrightarrow{G} & X \end{array}$$

In other words, if s is an input spectrum in CW, x is its colorimetric value under observer map ΓQ, then the spectral gamut mapping $\overline{G}$ will map s to $\overline{G}(s)$, which will have colorimetric value G(x).

Figure 3:
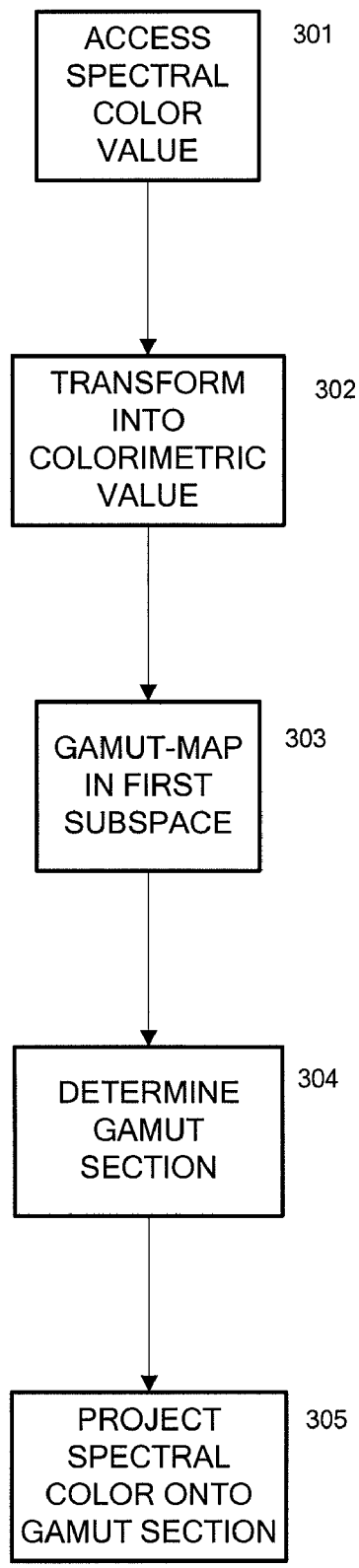
FIG. 3 is a process flowchart of a method of mapping spectral colors according to one example embodiment of the present invention.
Figure 4:
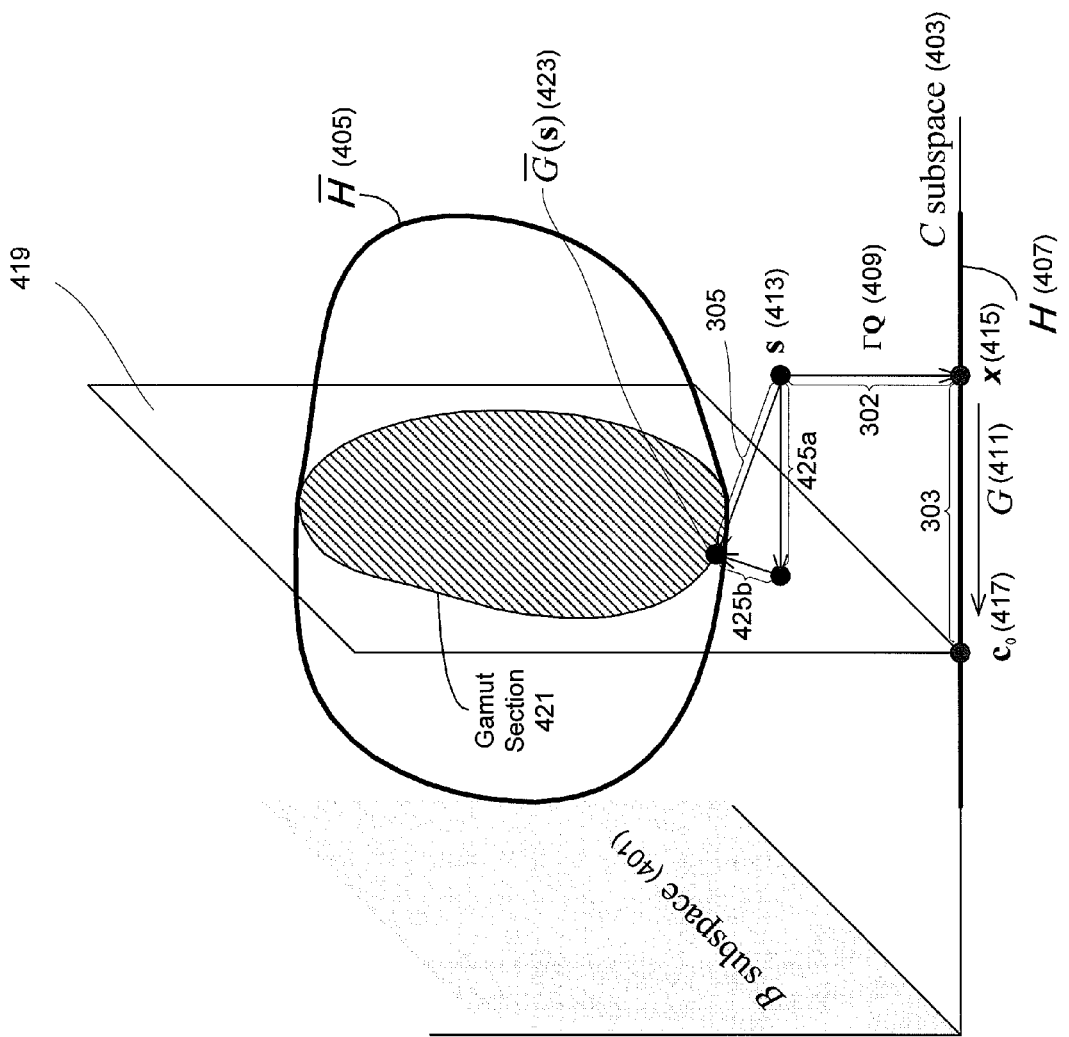
FIG. 4 is a representational diagram illustrating various operations and transformations of a method according to one example embodiment of the present invention.

A more detailed description of the present example embodiment will now be presented with reference to FIGS. 3 and 4. FIG. 3 is a process flowchart of a method of mapping spectral colors according to the present example embodiment. FIG. 4 is a representational diagram that is used to illustrate various operations and transformations of the method of FIG. 3 in an Interim Connection Space (ICS) including a subspace B 401 and a subspace C 403. Due to the inherent limitations in graphically depicting spaces having more than three dimensions, subspace B 401 is illustrated as a two-dimensional space, and subspace C 403 is illustrated as a one-dimensional space. However, this is for the purpose of illustration only. In particular, it is noted that subspaces B and C are typically of higher dimensions.

FIG. 4 also includes a spectral gamut $\overline{H}$ 405 in the ICS CW, a calorimetric gamut 407 H in the subspace C 403, a map ΓQ 409 from CW to the subspace C 403, and a gamut mapping 411 G in the subspace C 403.

Referring to FIGS. 3 and 4, in the method of mapping spectral colors according to the present example embodiment, a spectral color value is accessed (301), for example, as an input spectrum s 413 in CW. In other embodiments, the input spectrum could be accessed in full spectral space, S. The colorimetric value of s is calculated (302) via map ΓQ 409 by the equation x=ΓQ(s). The colorimetric value x 415 is then mapped (303) by G 411 to obtain $c_0$=G(x) 417, which should be within calorimetric gamut H if G is a gamut mapping on X.

If the result G(x) of mapping 303 is not within H, then an additional projection can be performed. In particular, a "minimum distance" projection onto H can be performed. The distance used is that of C, not X, however, because distance in C is associated with CW, which in the present example embodiment is a better distance to use. The result of this minimum distance projection is then set as $c_0$ (417).

An intersection of H with the affine subspace 419 defined by c=$c_0$ is determined (304). This intersection, or gamut section 421, is the set of admissible spectra that are candidates for the selection of a mapped spectral color $\overline{G}(s)$ 423. Input spectrum s 413 is projected (305) onto gamut section 421. For example, this projection can be performed by first projecting (425a) onto affine subspace 419, then projecting (425b) onto gamut section 421 within affine subspace 419.

In the present example embodiment, the projection (305) is performed based on a shortest distance criteria. In other words, mapped spectral color $\overline{G}(s)$ 423 is selected from among the admissible spectra that have the same calorimetric value G(x), i.e., the spectra that lie within the same gamut section 421, such that the distance between the input spectrum s and the selected spectral color is minimized. The distance metric used is a metric of CW.

The method of the present example embodiment can be utilized in many applications. For example, in one example application of the present embodiment, X is the CIEXYZ space, and the gamut mapping G is constructed from a "minimum distance" mapping on CIELAB or a color appearance space:

$$\begin{array}{ccc} CIEXYZ & \xrightarrow{G} & CIEXYZ \\ \downarrow & & \uparrow \\ CIELAB & \xrightarrow{Min\ Distance\ Map} & CIELAB \end{array}$$

In this regard, the present example embodiment can be directed to mapping spectral colors in an ICS based on a G that is a "minimum distance mapping" on CIELAB or a color appearance space. This is just one application of the present example embodiment, and one skilled in the art will understand how the present embodiment can be applied in other applications as well.

Figure 5:
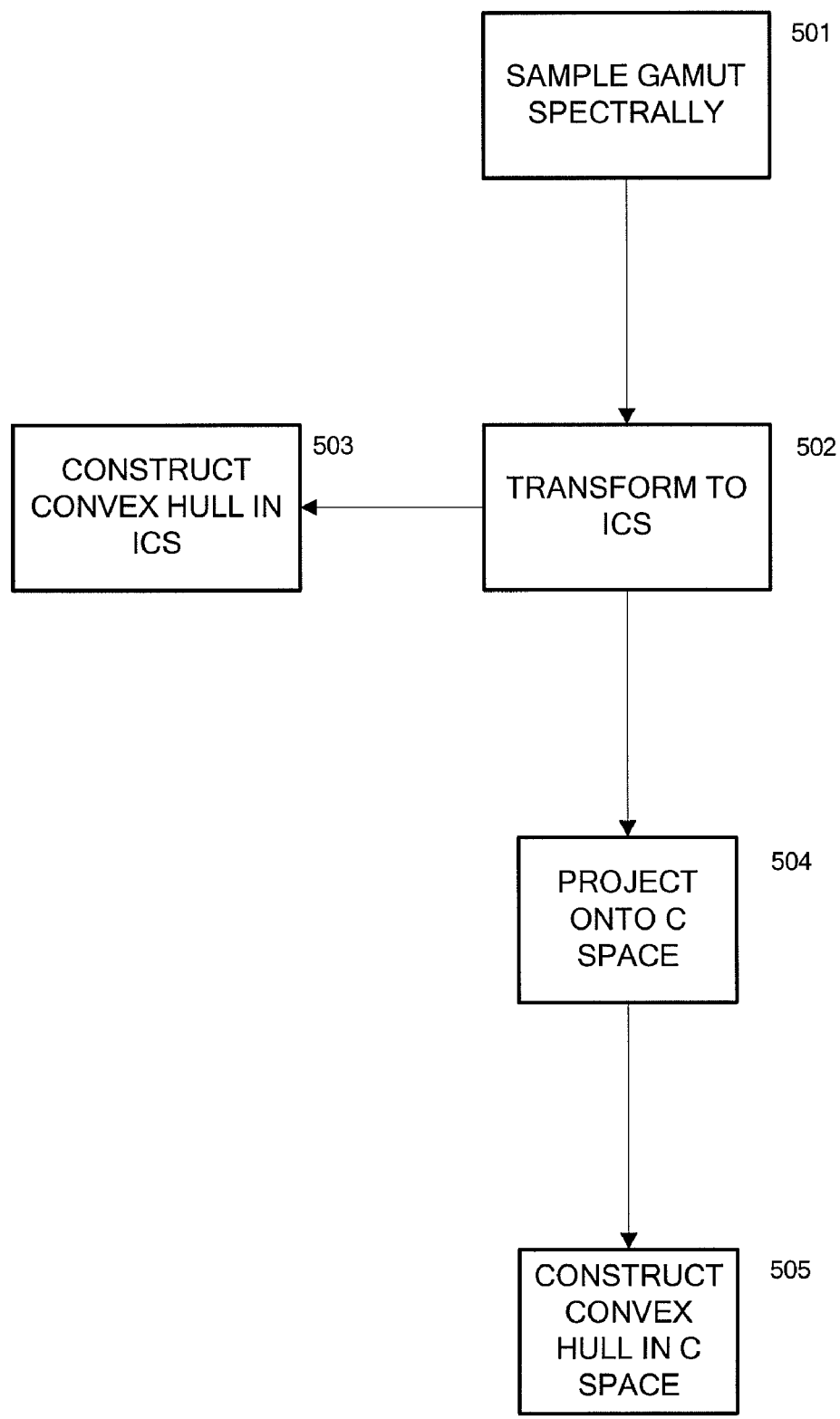
FIG. 5 is a process flowchart of a method of determining gamuts according to one example embodiment of the present invention.

It is noted that gamuts $\overline{H}$ and H are predetermined in this example embodiment. However, other embodiments could include the determination of gamuts $\overline{H}$ and H. FIG. 5 illustrates one example method of determining gamuts in CW and C, which can be used as $\overline{H}$ and H, respectively.

Referring to FIG. 5, a gamut $\overline{H}$ in CW is first constructed by sampling (501) the gamut spectrally. The spectral measurement samples will fall in the full spectral space S. These sampled values are transformed (502) to ICS CW. The values in ICS CW can be used to construct gamuts $\overline{H}$ and H. To construct gamut $\overline{H}$, a convex hull can be constructed in CW(503). To construct H, the values in CW can be projected (504) onto space C, and then a convex hull can be constructed in C(505).

Figure 6:
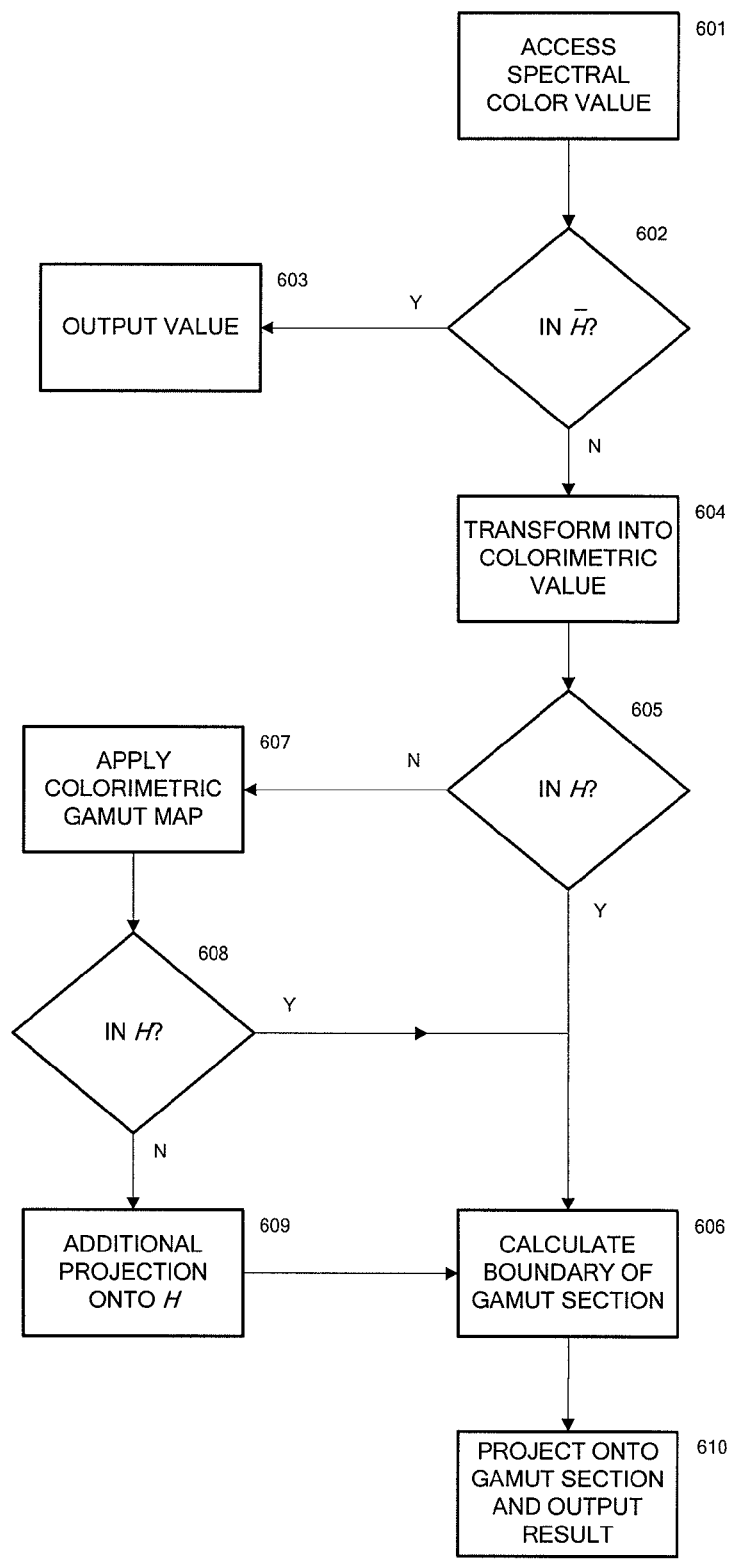
FIG. 6 is a process flowchart of another example embodiment of the present invention.

Another example embodiment of the present invention will now be described with reference to FIG. 6. In this example embodiment, computation of a gamut section is avoided in certain cases in which the calorimetric gamut mapping G does not change a color if the color already lies within the calorimetric gamut. In this case, it might be beneficial to construct a spectral gamut mapping $\overline{G}$ that does not change an input spectral color value if the input spectrum is already inside the spectral gamut $\overline{H}$.

In this regard, when a spectral color value s is accessed (601), the process checks (602) if s is in $\overline{H}$. If $\overline{H}$ is constructed as a convex hull, then checking (602) can be performed by evaluating inequalities, one for each hyperplane that bounds the convex hull. If s is in the spectral gamut, no further work is needed, and s is output (603) as the mapped spectral color $\overline{G}$(s). At 602, if s is outside $\overline{H}$, its colorimetric value c is determined (604) (or equivalently, it is projected onto the subspace C). The process then checks (605) if c is inside colorimetric gamut H. If c is in H, then the boundary of the gamut section at c is calculated (606). If c is outside H, then c is mapped (607) via gamut mapping G to obtain a mapped c. The process checks (608) if the mapped c is in H. If the mapped c is in H, the boundary of the gamut section at mapped c is calculated (606).

If mapped c is outside H, an additional projection to gamut H is performed (609) with respect to the distance in the C subspace, and the boundary of the gamut section is calculated (606) based on the result of the projection. It is noted that one reason a colorimetric gamut mapping G might not bring c into H exactly is that gamuts constructed in different color spaces can be slightly different. For example, if G is constructed from a minimum distance mapping in CIELAB, and the gamut in CIELAB is also constructed as a convex hull in that space, that gamut may not correspond exactly to H, which lies in the C subspace. This is because CIELAB is nonlinearly related to CIEXYZ, which in turn implies that it is also nonlinearly related to the C subspace.

After the boundary of the gamut section is calculated at 606, the spectral color value is projected (610) onto the boundary to obtain the mapped spectral color $\overline{G}$(s), and the mapped spectral color is output. In one benefit of the method of the present example embodiment, a spectral gamut is constructed in the ICS in a more intuitive way, and it is possible to visualize the spectral gamut as a simple volume in the ICS. In addition, the method produces a spectral gamut mapping that is a continuous extension of the calorimetric gamut mapping from calorimetric space to spectral space. Most, if not all, colorimetric gamut mapping algorithms, as well as gamut mappings in other spaces that are not necessarily calorimetric, can be extended to a spectral gamut mapping using this method.

Facet Sectioning

One method of facet sectioning according to an example embodiment will now be described with reference to FIGS. 7 and 8. This method is one method that can be used in calculating a gamut section, such as the calculation of the gamut section at 606 of FIG. 6. Suppose the dimension of the ICS is n, and dimension of the gamut $\overline{H}$ as a convex hull is also n. In particular, the boundary of the spectral gamut $\overline{H}$ consists of (n−1)-dimensional simplices, or facets. The boundary of the gamut section is therefore the collection of sections of the facets.

Figure 7:
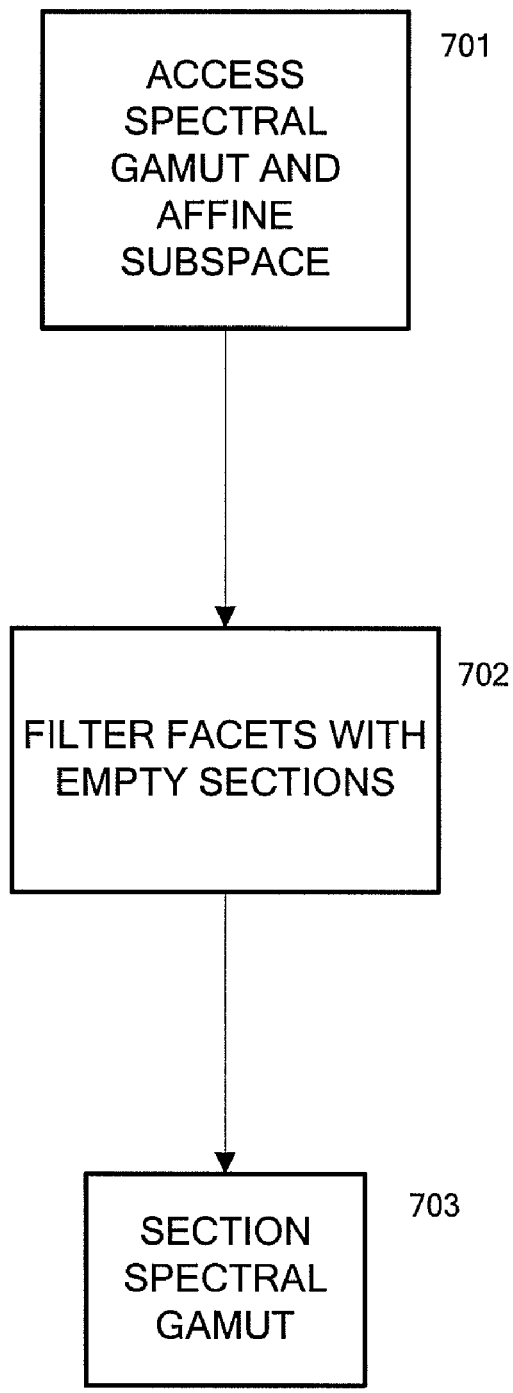
FIG. 7 is a process flowchart of a method of facet sectioning according to one example embodiment of the present invention.

FIG. 7 shows an overview of a facet sectioning method that includes an optimization to avoid unnecessary calculations involving facets having empty sections. In particular, the spectral gamut $\overline{H}$ and the affine subspace defined by $c=c_0$ are accessed (701). The facets that would definitely have an empty section are determined using a set of preliminary conditions and filtered in the calculation of the gamut section boundary (702). The following conditions are used in the determination. Namely, suppose $c_0=(c_1, c_2, c_3)$ and a facet is defined by vertices $p_0, p_1, \ldots, p_{n-1}$. If the projections of $p_0$, $p_1, \ldots p_{n-1}$ onto the $c_1$-axis are all bounded away from $c_1$, i.e., one of the following conditions is satisfied:

$$\max_{i=0,\ldots,n-1}(1st\text{ projection of }p_i) < c_1$$

or $$\min_{i=0,\ldots,n-1}(1st\text{ projection of }p_i) < c_1$$

then this facet will have empty section with the affine space at $c=c_0$. Projections onto the $c_2$-axis and the $c_3$-axis each have a corresponding set of two conditions. These conditions are computationally inexpensive to check, and by filtering out facets using these conditions, the calculation of the boundary of the gamut section can be sped up.

The spectral gamut $\overline{H}$ is sectioned (703). This is done by intersecting the affine subspace at $c=c_0$ with each of the facets that have not been filtered in the preliminary step. In particular, each boundary facet of the convex hull of spectral gamut $\overline{H}$ is a m-dimensional simplex sitting in the n-dimensional ICS CW, where m=n−1. Denoting the vertices of the simplex by $p_0, p_1, \ldots, p_m$, any point x in the simplex can be described by the equations:

$$x = p_0 + t_1 v_1 + t_2 v_2 + \ldots + t_m v_m$$

$$v_1 = p_1 - p_0, v_2 = p_2 - p_0, \ldots, v_m = p_m - p_0$$

$$t_1, \ldots, t_m \geq 0, t_1 + t_2 + \ldots + t_n \leq 1$$

"Sectioning" refers to the operation of intersecting this simplex with a dimension (n−3), or codimension 3, affine subspace, defined by the equations $$x_1 = c_1$$

$$x_2 = c_2$$

$$x_3 = c_3$$

Generally, the intersection will be a convex set (but not necessarily a simplex) of dimension m−3=n−4.

In principle, the above problem can be addressed by solving a set of linear equations. However, solving the set of linear equations (which may include checking the solution against the inequalities) for each facet can potentially lead to problems. For example, the number of facets grows exponentially with n. To illustrate this, a calculation of the gamut hull in ICSs of various dimensions was performed for a Canon i9900 inkjet printer, and the following data were obtained:

| | n | | | |
|---|---|---|---|---|
| | 5 | 6 | 7 | 8 |
| #Facets | 10244 | 58882 | 316630 | 2803365 |

As n increases, the large number of facets involved can proscribe the use of many typical routines for solving the linear equations. Solving the linear equations entails a transformation of the parameters $t_1, t_2, \ldots, t_m$ to new parameters so that the new system of equations is easier to solve. In particular, because the intersection is expected to be of dimension m−3, there should be m−3 "free" parameters after the transformation. In one method, solving the linear equations entails performing a linear transformation from the parameters $t_1, t_2, \ldots, t_m$ to new parameters $s_1, s_2, \ldots, s_m$, part of which will form the "free" parameters. It is noted that a large part of this transformation can be pre-computed for each facet, independently of $c_1, c_2, c_3$. This pre-computation could be particularly beneficial when gamut mapping a lot of colors, as is typically done when building an interpolation lookup table (LUT).

Using matrix notation, the above equations can be written as:

$$t = \begin{pmatrix} t_1 \\ t_2 \\ \vdots \\ t_m \end{pmatrix},$$

$$A = (v_1 \ v_2 \ \cdots \ v_m)$$

$$x = p_0 + At$$

A 3×m matrix $\tilde{A}$ is obtained by taking the first three rows of A. Recall that the first three coordinates of the space CW correspond to the C subspace. SVD is performed on $\tilde{A}$, resulting in the following decomposition:

$$\tilde{A} = UDV^T$$

where U is a 3×3 orthogonal matrix, D is a 3×m "diagonal" matrix of the form:

$$D = \begin{pmatrix} d_1 & 0 & \cdots & \cdots & \cdots & 0 \\ 0 & d_2 & 0 & \cdots & \cdots & 0 \\ 0 & 0 & d_3 & 0 & \cdots & 0 \end{pmatrix}$$

with $d_1 \geq d_2 \geq d_3$, and V is an m×m orthogonal matrix. If the simplex is in "general position", then $d_3 > 0$, meaning that the projection of the simplex onto the C subspace is a 3-dimensional simplex. Now define the coordinate transformation:

$$t = Vs, \ s = \begin{pmatrix} s_1 \\ s_2 \\ \vdots \\ s_m \end{pmatrix}$$

Under this transformation, it can be shown from the SVD that only $s_1, s_2, s_3$ are needed to determine $x_1, x_2, x_3$. In other words, $s_4, \ldots, s_m$ are "free" parameters. Splitting the first three rows/columns of the matrices, the following partitioning is obtained:

$$A = \begin{pmatrix} \tilde{A} \\ \cdots \\ \hat{A} \end{pmatrix},$$

$$x = \begin{pmatrix} \tilde{x} \\ \cdots \\ \hat{x} \end{pmatrix},$$

$$p_0 = \begin{pmatrix} \tilde{p}_0 \\ \cdots \\ \hat{p}_0 \end{pmatrix},$$

$$V = (\tilde{V} \ : \ \hat{V}),$$

$$s = \begin{pmatrix} \tilde{s} \\ \cdots \\ \hat{s} \end{pmatrix}$$

$$\tilde{x} = \tilde{p}_0 + \tilde{A}\tilde{V}\tilde{s} + \tilde{A}\hat{V}\hat{s} = \tilde{p}_0 + \tilde{A}\tilde{V}\tilde{s}$$

$$\hat{x} = \hat{p}_0 + \hat{A}\tilde{V}\tilde{s} + \hat{A}\hat{V}\hat{s}$$

It is noted that in the above, $\tilde{A}\hat{V}\hat{s}=0$ because of the zeroes in D. From this, it follows that for each facet, the following can be pre-computed for reuse for different input spectra:

$B = \tilde{A}\tilde{V}$ (3×3 matrix) and its inverse $B^{-1}$, $C = \hat{A}\hat{V}$ (n−3×m−3 matrix), and if n≧6, its Moore-Penrose inverse $C^+$, and $H = \hat{A}\tilde{V}$.

Note that B is invertible because of the assumption that $d_3 > 0$. The pseudo-inverse $C^+$ is used in the calculation of the closest point of the simplex section from a given point. For n≦5, the simplex section is either a point or a line segment, and a direct calculation will be used instead.

With these pre-computed quantities, solving the equations $\tilde{x} = c = (c_1, c_2, c_3)^T$ for each facet involves the following steps.

First, the constrained parameters are computed via the equation $\tilde{s} = B^{-1}(c - \tilde{p}_0)$. This is followed by the computation of the new "origin" in the n−3 dimensional $\hat{x}$-space via the equation $q_0 = \hat{p}_0 + H\tilde{s}$. The m−3 free parameters $\hat{s}$ parameterize an affine subspace inside the n−3 dimensional $\hat{x}$-space by the following equation:

$$\hat{x} = q_0 + C\hat{s}$$

However, because the simplex is defined by a set of inequalities, $\hat{s}$ is not completely free, but is also constrained by similar inequalities. Using the equation t=Vs and writing $V=(V_{ij})$, these inequalities are:

$$\sum_{j=4}^{m} V_{1j} s_j + k_1 \geq 0$$

$$\vdots$$

$$\sum_{j=4}^{m} V_{mj}s_j + k_m \geq 0$$

$$\sum_{i=1}^{m}\sum_{j=4}^{m} V_{ij}s_j + k_0 \leq 1$$

where the constants are defined by $$k_1 = V_{11}s_1 + V_{12}s_2 + V_{13}s_3$$

$$\vdots$$

$$k_m = V_{m1}s_1 + V_{m2}s_2 + V_{m3}s_3$$

$$k_0 = \sum_{i=1}^{m}\sum_{j=1}^{3} V_{ij}s_j$$

These inequalities define a convex set in ŝ-space, which in turn defines a convex set in x̂-space via the above parameterization.

To sum up, through a series of linear transformations that can be pre-computed for each facet, computation of a facet section is reduced to the problem of computing a convex set in the m−3 dimensional ŝ-space defined by the above inequalities. Example embodiment of this computation for the first two low dimensions n, n=5(m=4) and n=6(m=5) will be described next.

The n=5(m=4) case will now be described. In this case, the facet section is a 1-dimensional convex set. It must therefore be a line segment. Accordingly, a solution can be obtained by determining the corresponding closed interval in the 1-dimensional $s_4$-space that would give this intersection via the parametrization $\hat{x}=q_0+C\hat{s}$. In the present case, the above inequalities simplify to:

$$V_{14}s_4 + k_1 \geq 0$$

$$\vdots$$

$$V_{44}s_4 + k_4 \geq 0$$

$$s_4 \sum_{i=1}^{4} V_{i4} + k_0 \leq 1$$

Each of these inequalities can be cast into the form $\alpha s_4 + \beta \geq 0$, so that each either gives a lower bound $s_4 \geq -\beta/\alpha$ if $\alpha>0$ or an upper bound $s_4 \leq -\beta/\alpha$ if $\alpha<0$. If $\alpha=0$, then the inequality is impossible if $\beta<0$, i.e., the intersection is empty. In general, the collection of all upper/lower bounds either gives an impossible set of inequalities, leading to the conclusion that the intersection is empty, or gives a finite closed interval in $s_4$-space.

Figure 8:
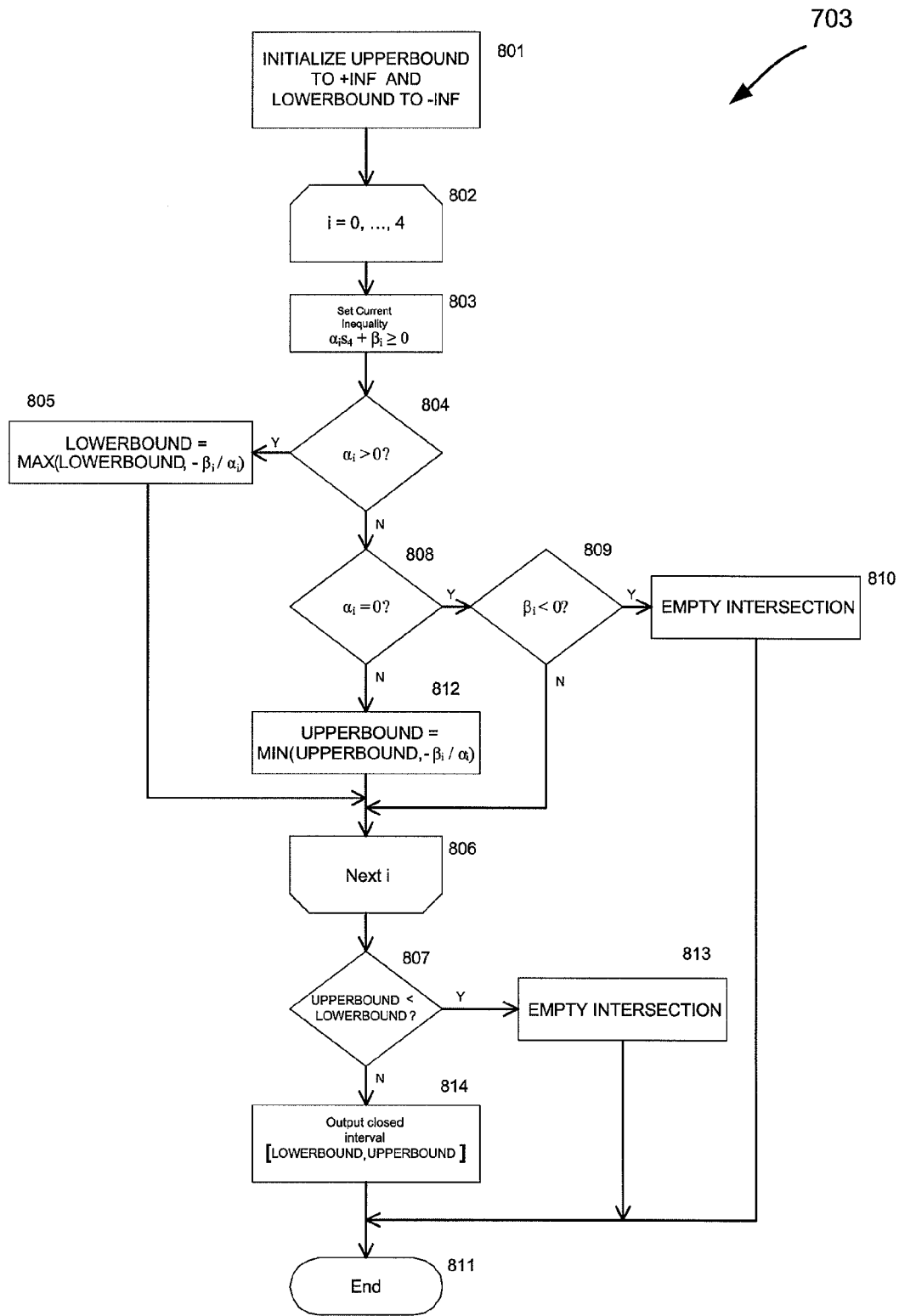
FIG. 8 is a process flowchart showing more detail of a method of facet sectioning according to one example embodiment of the present invention.

FIG. 8 is a more detailed flowchart showing the processes performed in one example embodiment of sectioning 703. An upper bound is initialized to +INF and a lower bound to −INF (801). +INF and −INF are system specific parameters. For example, in the IEEE double precision floating point system, ±INF are approximately ±1.7976931348623157 ×10³⁰⁸. An iteration index i is set (802) to run from zero to 4. The current inequality is set (803) as: $\alpha_i s_4 + \beta_i \geq 0$. The process determines (804) whether $\alpha_i>0$. If $\alpha_i>0$, then the lower bound is set (805) equal to the maximum of the lower bound and $-\beta_i/\alpha_i$, and the iteration is advanced (806) by incrementing the iteration step i and returning to 803 (if the current i<4), or the process proceeds to 807 (if the current i=4).

At 804, if $\alpha_i \leq 0$ then the process determines (808) whether $\alpha_i=0$. If $\alpha_i=0$, then the process determines (809) whether $\beta_i<0$. If $\beta_i<0$ then the intersection is determined (810) as empty, and the process ends (811).

At 809, if $\beta_i \geq 0$ then the process is iterated (806). At 808, if $\alpha_i<0$ then the upper bound is set (812) equal to the minimum of the upper bound and $-\beta_i/\alpha_i$, and the process is iterated (806).

At 807, the upper bound is compared to the lower bound. If the upper bound is less than the lower bound, then the intersection is determined (813) as empty, and the process ends (811). If the upper bound is not less than the lower bound at 807, then the values of the upper bound and the lower bound are output (814), and the process ends (811).

If the process determines that the intersection is non-empty, and the output at 814 is $[s_4^{min}, s_4^{min}]$, the closest point of this line segment from a given point p in the 5-dimensional ICS can be determined by computing the closest point of this line segment from p̂ in the 2-dimensional x̂-space using known techniques. For example, if $q_1=q_0+Cs_4^{min}$, $q_2=q_0+Cs_4^{max}$, the closest point on the line segment is given by:

$$q = q_1 + \lambda^*(q_2 - q_1) \text{ where } \lambda^* = \max\left(0, \min\left(1, \frac{(\hat{p} - q_1)\cdot(q_2 - q_1)}{(q_2 - q_1)\cdot(q_2 - q_1)}\right)\right).$$

Finally, it is noted that in this simple case, determination of the pseudo-inverse $C^+$ not necessary, rather, it implicitly appears in the above closed form solution.

The n=6(m=5) case will now be described. In this case, the facet section is a 2-dimensional convex set. Through the parametrization $\hat{x}=q_0+C\hat{s}$, there is a corresponding convex set in the 2-dimensional $(s_4, s_5)$-space defined by the following six inequalities:

$$V_{14}s_4 + V_{15}s_5 + k_1 \geq 0$$

$$\vdots$$

$$V_{54}s_4 + V_{55}s_5 + k_5 \geq 0$$

$$s_4 \sum_{i=1}^{5} V_{i4} + s_5 \sum_{i=1}^{5} V_{i5} + k_0 \leq 1$$

Again, each inequality is of the form $\alpha_i s_4 + \beta_i s_5 + \gamma_i \geq 0$, i=0, 1, . . . , 5. To compute the closest point of facet section from a given point p in the 6-dimensional ICS, we first project p to p̂ in the 3-dimensional x̂-space, then project p̂ to the 2-dimensional facet section within the x̂-space. The projection of p̂ onto the 2-dimensional affine subspace containing the facet section is given by:

$$\hat{s}=C^+(\hat{p}-q_0)$$

The projection $\hat{s}=(s_4,s_5)$ is then tested against the six inequalities. If all the inequalities are satisfied, then the projection is also inside the facet section, and the closest point is therefore obtained. If at least one of the inequalities is not satisfied, then the closest point occurs on the boundary of the facet section. In this case, the vertices of the facet section need to be computed. In other words, we need to compute the intersection of the half planes defined by the inequalities.

One method of computing a half-plane intersection uses divide-and-conquer approach. However, that algorithm requires a point in the intersection to start. In other words, a separate algorithm, such as a linear program solver, is required to find a solution first, if there is any. In the present example case, there is no a priori knowledge of such a solution, or the knowledge that one exists. On the other hand, it involves only six half-planes/inequalities and the intersection is known to be bounded. In this case, one example method using a direct (not divide-and-conquer) approach that includes determining if the intersection is empty or not, and if not, computing the vertices, all at the same time, will now be described.

An initial bounding box in $(s_4,s_5)$-space can be obtained from the relationship $s=V^T t$. The unit vectors in t-space span the facet by construction, and when they are transformed into the s-space and projected onto the $(s_4,s_5)$-subspace, they determine a bounding box. In other words, the bounding box can be taken as:

$$s_4^{min} \leq s_4 \leq s_4^{max}$$

$$s_5^{min} \leq s_5 \leq s_5^{max}$$

where $$s_4^{min} = \min_{j=1,\ldots,5} V_{j4}$$

$$s_4^{max} = \max_{j=1,\ldots,5} V_{j4}$$

$$s_5^{min} = \min_{j=1,\ldots,5} V_{j5}$$

$$s_5^{max} = \max_{j=1,\ldots,5} V_{j5}$$

Figure 9:
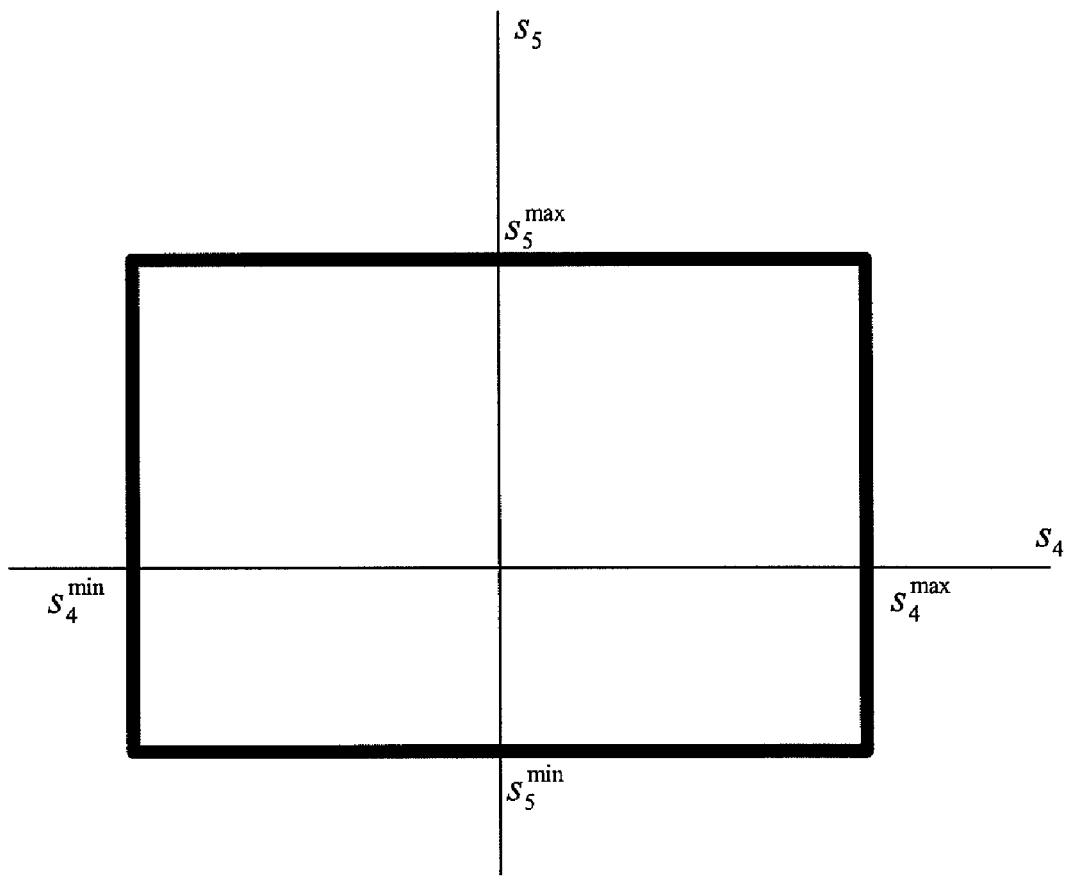
FIG. 9 is a representational diagram of an initial bounding box according to one example embodiment of the present invention.

An example initial bounding box is shown in FIG. 9. This initial bounding box is successively intersected by a half-plane defined by the inequality $\alpha_i s_4 + \beta_i s_5 + \gamma_i \geq 0$.

Figure 10:
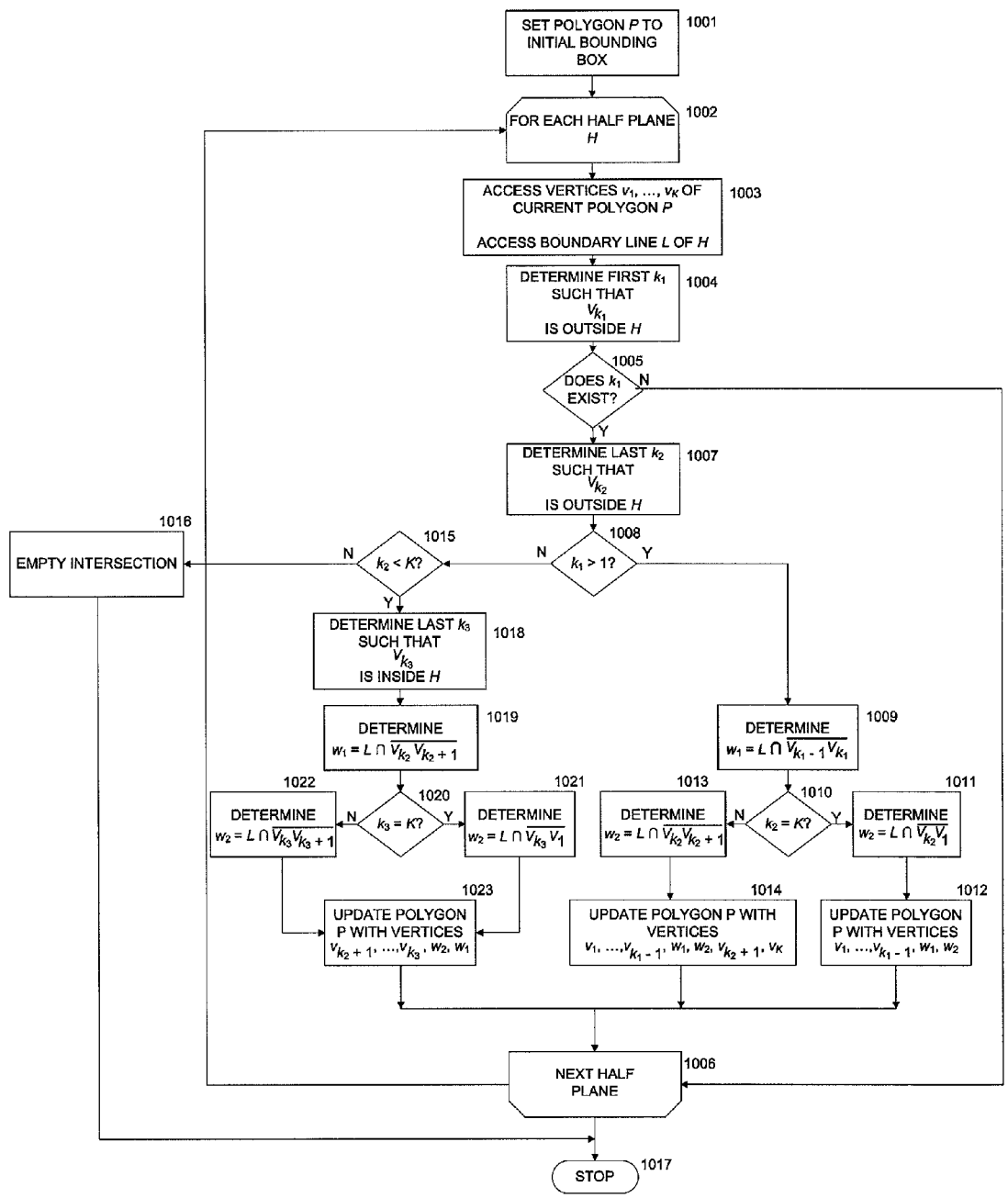
FIG. 10 is a process flowchart of a method of determining a half-plane intersection according to one example embodiment of the present invention.

FIG. 10 shows one method of determining a half-plane intersection according to one example embodiment of the present invention. In this example case, the polygon to be intersected at a certain point has K vertices $v_1, \ldots, v_K$.

The polygon P is set (1001) to the initial bounding box, such as the one described above, and a half plane H is selected (1002). The vertices $v_1, \ldots v_K$ of the current polygon P, and a boundary line L of H, are accessed (1003). A first index $k_1$ is determined (1004) such that $v_{k_1}$ is outside of H.

If (1005) first index $k_1$ does not exist, then the whole polygon is inside the half-plane. In other words, intersection of the polygon with the half-plane is the polygon itself. The next half-plane (1006) is then accessed, and the process is iterated (1002) using the next half-plane. If $k_1$ exists, then the last index $k_2$ is determined (1007) such that $v_{k_2}$ is outside of H. The value of $k_1$ is compared (1008) to 1. If $k_1 > 1$, then a first new vertex $$w_1 = L \cap \overline{v_{k_1-1} v_{k_1}}$$

is determined (1009). The value of $k_2$ is now compared (1010) to K. If $k_2$ is equal to K, then a second new vertex $$w_2 = L \cap \overline{v_{k_2} v_1}$$

is determined (1011), polygon P is updated (1012) with vertices $v_1, \ldots, v_{k_1-1}, w_1, w_2$, and the process proceeds to 1006. On the other hand, if $k_2$ is less than K at 1010, then a second new vertex $$w_2 = L \cap \overline{v_{k_2} v_{k_2+1}}$$

is determined (1013), polygon P is updated (1014) with vertices $v_1, \ldots v_{k_1-1}, w_1, w_2, v_{k_2+1}, v_k$, and the process proceeds to 1006.

Referring again to 1008, if $k_1$ is equal to 1, the value of $k_2$ is compared (1015) to K. If $k_2$ is equal to K, then every vertex is outside of H. The intersection is determined (1016) to be empty, and the process ends (1017). On the other hand, if $k_2$ is less than K, then the last index $k_3$ is determined (1018) such that $V_{k_3}$ is inside of H, and a first new vertex $$w_1 = L \cap \overline{v_{k_2} v_{k_2+1}}$$

is determined (1019). Next, $k_3$ is compared (1020) to K. If $k_3$ is equal to K, then a second new vertex $$w_2 = L \cap \overline{v_{k_3} v_1}$$

is determined (1021), and the process proceeds to 1023. On the other hand, if $k_3$ is less than K, then a second new vertex $$w_2 = L \cap \overline{v_{k_3} v_{k_3+1}}$$

is determined (1022), and the process proceeds to 1023.

At 1023, polygon P is updated with vertices $v_{k_2+1}, \ldots, v_{k_3}$, $w_2, w_1$, and a next iteration is performed with a next half-plane (1006). At 1006, if there are no remaining half-planes, the process ends (1017).

When the above process is iterated through all six inequalities, the result is either that the intersection is empty, or an ordered list of vertices that lie on the boundary of the facet section. In the latter case, the closest point to $\hat{p}$ is the closest point on a line segment connecting two consecutive vertices.

Figure 11:
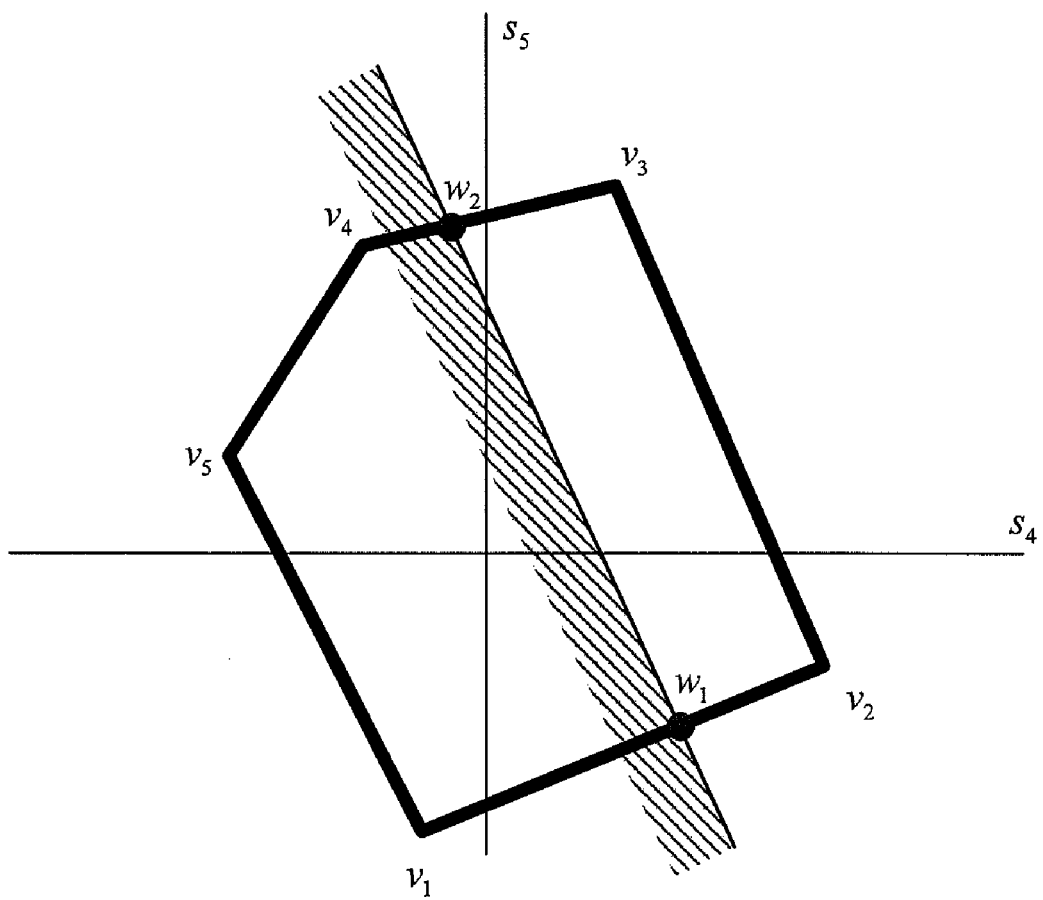
FIG. 11 is a representational diagram of an example iteration step.

FIG. 11 illustrates an example iteration step in the construction of the facet section.

Figure 12:
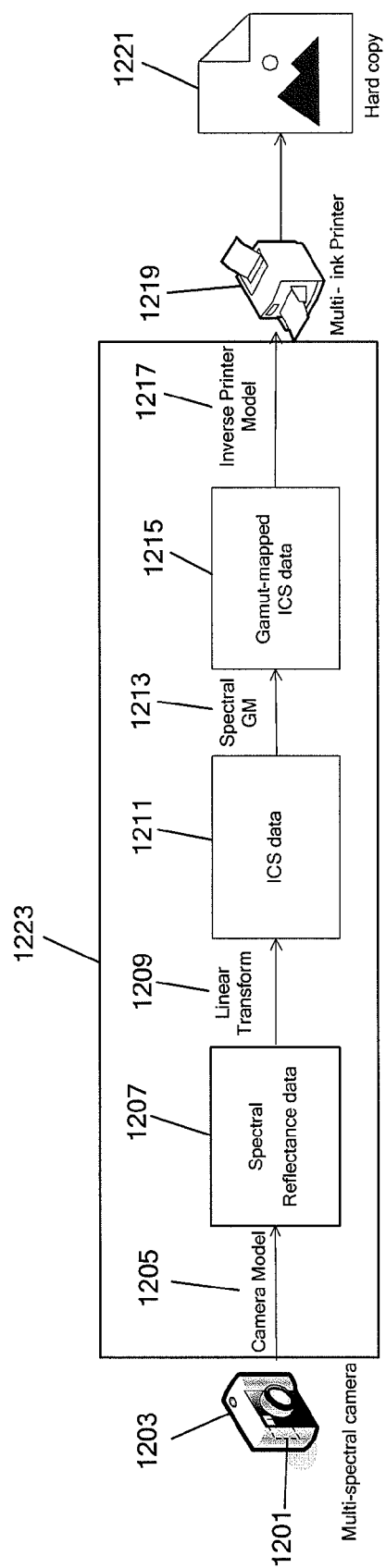
FIG. 12 is a representational diagram of an example workflow in which methods according to the present invention can be implemented.

FIG. 12 shows one example embodiment of the present invention. In particular, FIG. 12 shows an example printer workflow utilizing a spectral gamut mapping generated by methods of the present invention.

In the present example workflow of FIG. 12, source image data 1201 from a source multi-spectral device, such as a multi-spectral camera 1203, is converted into spectral reflectance data 1207 using a device transform, such as a camera model 1205. Spectral reflectance data 1207 is transformed into ICS data 1211 using a linear transform 1209 provided by the ICS. A spectral gamut-mapping 1213, such as one generated by methods of the present invention, is performed on ICS data 1211 to obtain gamut-mapped ICS data 1215. An inverse printer model 1217 is applied to gamut-mapped ICS data 1215, and the resulting data is sent to a multi-ink output printer 1219, for example, which produces a hard copy 1221 of image data 1201.

Elements 1205 to 1217 of FIG. 12 define a color management module (CMM) 1223, which can be implemented, for example, as part of program instructions 217 executed by data processing system 40 of FIG. 2.

Constrained ICS

One example construction of a constrained ICS will now be described with reference to a full-rank linear transformation $\Gamma:S \to X$ from the full spectral space S to a color space X and an ICS W that does not already possess the additional properties of a constrained ICS.

Figure 13:
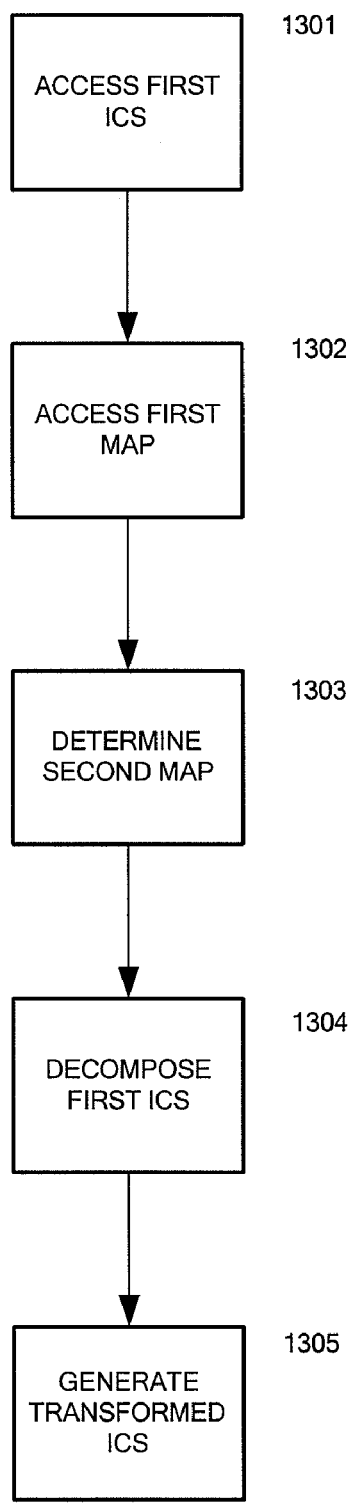
FIG. 13 is a process flowchart of an example method of constructing a constrained Interim Connection Space (ICS).

Referring now to FIG. 13, an n-dimensional ICS W in an N-dimensional full spectral space S is accessed (1301). The ICS W includes associated linear transformations to and from the full spectral space S:

P:S→W

Q:W→S

A "constraining" linear map $\Gamma$ is accessed (1302). The linear map $\Gamma:S \to X$ goes from S to a k-dimensional space X. The rank of $\Gamma$ is k in this example embodiment. For example, X can be the 3-dimensional CIEXYZ space, and $\Gamma$ can be the operation of spectral integration of the spectral reflectance with the SPD of a chosen illuminant.

From the sequence of linear transformations, $$W \xrightarrow{Q} S \xrightarrow{\Gamma} X,$$

an overall linear transformation from W to X, which is represented as a k×n matrix, $M_\Gamma$, is determined (1303). W is decomposed (1304) into a direct sum of two orthogonal subspaces: a subspace C of "constrained variables"; and a subspace B of "free variables". Because the rank of $\Gamma$ is k, which is also the dimension of X in this example embodiment, then the dimension of C is also k, and the dimension of B is n−k. The null space of matrix $M_\Gamma$ is the subspace B. In other words, $$B = \{p \in W | M_\Gamma p = 0\}$$

Subspace C is the orthogonal complement of B in W. Note that the determination of C depends on the inner product on W, whereas the determination of B does not.

One example method of decomposing W into subspace B and subspace C includes performing an orthogonal transformation on space W, i.e., change of coordinates. An orthogonal transformation can be obtained, for example, using eigenvalue analysis, such as SVD. Under the transformed coordinate system, the projections onto B and C are projections onto the coordinate planes of the transformed space, denoted CW.

In the present example embodiment, the orthogonal transformation on W is performed through SVD on the matrix $M_\Gamma$. Namely:

$$M_\Gamma = U_\Gamma D_\Gamma V_\Gamma^T$$

where $U_\Gamma$ and $V_\Gamma$ are k×k, resp. n×n orthogonal matrices, and $D_\Gamma$ is an k×n "diagonal" matrix of singular values sorted in non-increasing order and is of the form:

$$D_\Gamma = (\tilde{D}_\Gamma \; \vec{0})$$

where $\tilde{D}_\Gamma$ is a k×k diagonal matrix.

Subspace B and subspace C are used to generate (1305) a constrained ICS CW. In particular, $V_\Gamma^T$ is the desired orthogonal transformation for space W, because under this coordinate transformation, $$\begin{pmatrix} c_1 \\ \vdots \\ c_k \\ b_1 \\ \vdots \\ b_{n-k} \end{pmatrix} = V_\Gamma^T \begin{pmatrix} p_1 \\ \vdots \\ p_n \end{pmatrix},$$

so that $M_\Gamma p = U_\Gamma \tilde{D}_\Gamma (c_1 \ldots c_k)^T$. In other words, only the first k coordinates are used to determine the output of $M_\Gamma$, and they provide the coordinates for the subspace C, whereas $b_1, \ldots, b_{n-k}$ provide coordinates for the subspace B.

This example construction of a constrained ICS, CW, results in the following equations that give the transformations going to and from S and X.

From S to CW: $x \mapsto V_\Gamma^T P x = c \oplus b$

From S to CW to S: $c \oplus b \mapsto Q V_\Gamma (c \oplus b)$

The subspace C can be identified with X because they are related by a non-singular linear transformation, i.e., a non-singular square matrix of dimension k.

$C \to X$ $c \mapsto U_\Gamma \tilde{D}_\Gamma c$

Since $\Gamma$ is assumed to have full rank, the singular values in Dr are all non-zero, so that it is invertible.

$X \to C$ $\xi \mapsto \tilde{D}_\Gamma^{-1} U_\Gamma^T \xi$

Figure 14:
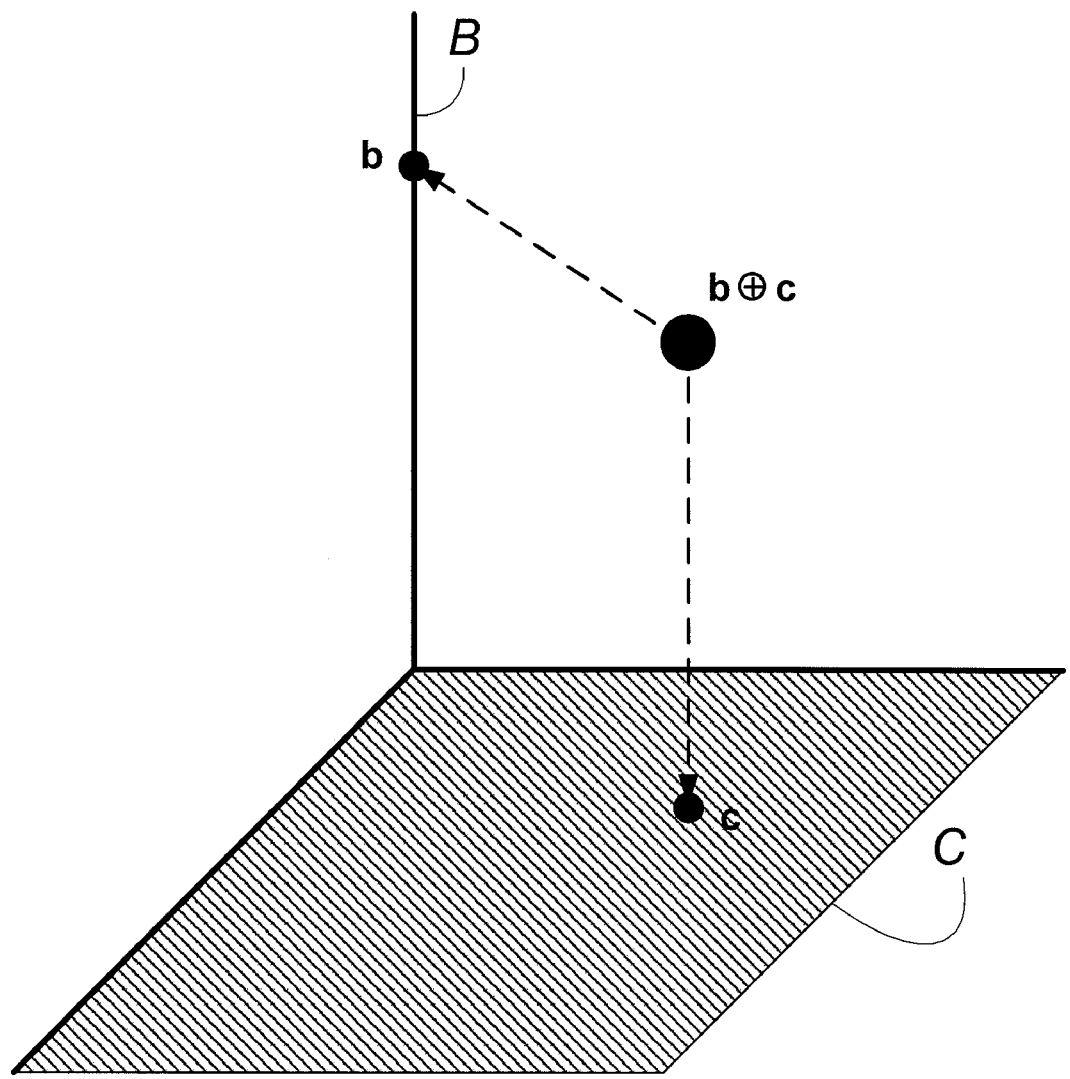
FIG. 14 is a representational diagram of an example geometry of a constrained ICS.

FIG. 14 is a graph of an example geometry of a constrained ICS. The example geometry is primarily for illustrative purposes, and shows a two-dimensional C subspace and a one-dimensional B subspace. The notation c⊕b is used to denote a point in the ICS that has coordinates c and b respectively in the C and B subspace.

Although the invention has been described in certain specific embodiments, many additional modifications and variations would be apparent to those skilled in the art. It is therefore to be understood that this invention may be practiced otherwise than as specifically described. Thus, the present embodiments of the invention should be considered in all respects as illustrative and not restrictive, the scope of the invention to be determined by any claims supportable by this application and the claims' equivalents rather than the foregoing description.

What is claimed is:

1. A method for mapping spectral colors in an Interim Connection Space of a full spectral space based on a colorimetric gamut map in a color space, the method comprising:
    accessing a spectral color value in the Interim Connection Space;
    transforming the spectral color value into a colorimetric color value in the color space;
    mapping, by using a processor, the colorimetric color value into mapped colorimetric color value in a first subspace of the Interim Connection Space, wherein mapping the colorimetric color value comprises gamut-mapping the colorimetric color value using the colorimetric gamut map, followed by identifying the color space with the first subspace;
    determining an intersection of a spectral gamut in the Interim Connection Space and an affine subspace characterized by the mapped colorimetric color value; and
    projecting the spectral color value onto the intersection,
    wherein the first subspace is an orthogonal complement of a null space of a transformation from the Interim Connection Space to the color space.

2. The method of claim 1, wherein the colorimetric gamut map comprises:
    mapping the colorimetric color value onto a colorimetric gamut in the color space.

3. The method of claim 2, wherein mapping the colorimetric color value onto a colorimetric gamut in the color space comprises:
    determining a minimum distance projection of the colorimetric color value onto the colorimetric gamut, wherein the minimum distance projection is based on a distance in the color space.

4. The method of claim 3, wherein accessing the spectral color value includes:
    determining whether the spectral color value is within the spectral gamut; and
    ending the method without performing the transforming, the mapping, the determining, or the projecting, if the spectral color value is within the spectral gamut.

5. The method of claim 2, further comprising constructing the colorimetric gamut, wherein constructing the colorimetric gamut comprises:

obtaining spectral measurements of color samples;

transforming the spectral measurements into the color space; and constructing a convex hull based on the transformed spectral measurements.

6. The method of claim 5, wherein transforming the spectral measurements into the color space comprises:

transforming the spectral measurements into the Interim Connection Space; and transforming the transformed spectral measurements in the Interim Connection Space into the color space.

7. The method of claim 1, further comprising constructing the spectral gamut, wherein constructing the spectral gamut comprises:

obtaining spectral measurements of color samples;

transforming the spectral measurements into the Interim Connection Space; and constructing a convex hull based on the transformed spectral measurements.

8. The method of claim 1, wherein projecting the spectral color value onto the intersection comprises:

projecting the spectral color value onto a closest point on the intersection.

9. The method of claim 1, wherein projecting the spectral color value onto the intersection comprises:

performing an orthogonal projection of the spectral color value onto the affine subspace; and projecting a result of the orthogonal projection onto the intersection.

10. An apparatus for mapping spectral colors in an Interim Connection Space of a full spectral space based on a colorimetric gamut map in a color space, the apparatus comprising:

an accessing unit constructed to access a spectral color value in the Interim Connection Space;

a transformation unit constructed to transform the spectral color value into a colorimetric color value in the color space;

a mapping unit constructed to map the colorimetric color value into mapped colorimetric color value in a first subspace of the Interim Connection Space, wherein mapping the colorimetric color value comprises gamut-mapping the colorimetric color value using the colorimetric gamut map, followed by identifying the color space with the first subspace;

a first determination unit constructed to determine an intersection of a spectral gamut in the Interim Connection Space and an affine subspace characterized by the mapped colorimetric color value; and a projection unit constructed to project the spectral color value onto the intersection, wherein the first subspace is an orthogonal complement of a null space of a transformation from the Interim Connection Space to the color space wherein the forgoing units are implemented by a processor.

11. The apparatus of claim 10, wherein the colorimetric gamut map comprises:

mapping the colorimetric color value onto a colorimetric gamut in the color space.

12. The apparatus of claim 11, wherein mapping the colorimetric color value onto a colorimetric gamut in the color space comprises:

determining a minimum distance projection of the colorimetric color value onto the colorimetric gamut, wherein the minimum distance projection is based on a distance in the color space.

13. The apparatus of claim 12, wherein the access unit is further constructed to determine whether the spectral color value is within the spectral gamut;

wherein the spectral color is mapped without performing the transforming, the mapping, the determining, or the projecting, if the spectral color value is within the spectral gamut.

14. The apparatus of claim 11, further comprising:

a colorimetric gamut constructing unit that constructs the colorimetric gamut, wherein the gamut constructing unit obtains spectral measurements of color samples, transforms the spectral measurements into the color space, and constructs a convex hull based on the transformed spectral measurements.

15. The apparatus of claim 14, wherein transforming of the spectral measurements into the color space comprises:

transforming the spectral measurements into the Interim Connection Space; and transforming the transformed spectral measurements in the Interim Connection Space into the color space.

16. The apparatus of claim 10, further comprising:

a spectral gamut constructing unit that constructs the spectral gamut, wherein the spectral gamut constructing unit obtains spectral measurements of color samples, transforms the spectral measurements into the Interim Connection Space, and constructs a convex hull based on the transformed spectral measurements.

17. The apparatus of claim 10, wherein projecting of the spectral color value onto the intersection comprises:

projecting the spectral color value onto a closest point on the intersection.

18. The apparatus of claim 10, wherein projecting of the spectral color value onto the intersection comprises:

performing an orthogonal projection of the spectral color value onto the affine subspace; and projecting a result of the orthogonal projection onto the intersection.

19. Computer-executable instructions stored on a computer-readable memory medium, the computer-executable instructions executable to map spectral colors in an Interim Connection Space of a full spectral space based on a colorimetric gamut map in a color space, said computer-executable process steps comprising process steps executable to perform a method according to any of claims 1 to 9.

20. An apparatus to map spectral colors in an Interim Connection Space of a full spectral space based on a colorimetric gamut map in a color space, the apparatus comprising:

a program memory that stores process steps executable to perform a method according to any of claims 1 to 9; and a processor coupled to the program memory that executes the process steps stored in said program memory.

* * * * *